(12) United States Patent
Mizrahi et al.

(10) Patent No.: US 8,250,399 B1
(45) Date of Patent: Aug. 21, 2012

(54) METHOD AND APPARATUS FOR CLOCK WANDER COMPENSATION

(75) Inventors: Tal Mizrahi, Haifa (IL); Carmi Arad, Nofit (IL); Martin White, Sunnyvale, CA (US); Tsahi Daniel, Palo Alto, CA (US)

(73) Assignees: Marvell International Ltd., Hamilton (BM); Marvell Israel (M.I.S.L.) Ltd., Yokneam (IL)

( * ) Notice: Subject to any disclaimer, the term of this patent is extended or adjusted under 35 U.S.C. 154(b) by 409 days.

(21) Appl. No.: 12/683,878

(22) Filed: Jan. 7, 2010

Related U.S. Application Data (60) Provisional application No. 61/143,287, filed on Jan. 8, 2009.

(51) Int. Cl.
*G06F 1/04* (2006.01)
*G06F 15/16* (2006.01)
*H03K 19/00* (2006.01)
*G01R 23/02* (2006.01)
*G01R 31/08* (2006.01)
*G01R 23/10* (2006.01)
*H03L 7/00* (2006.01)
*H03L 7/24* (2006.01)
*H03H 11/26* (2006.01)
*H03B 5/08* (2006.01)
*H04B 1/16* (2006.01)
*H04B 1/06* (2006.01)

(52) U.S. Cl. .......... 713/502; 713/503; 713/600; 326/93; 327/48; 327/160; 327/265; 327/273; 331/55; 331/172; 370/229; 375/293; 375/354; 455/208; 455/265; 702/78; 709/230

(58) Field of Classification Search .................. 713/502, 713/503, 600; 326/93; 327/48, 160, 265, 327/273; 331/55, 172; 370/229; 375/293, 375/354; 455/208, 265; 702/78; 709/230
See application file for complete search history.

(56) References Cited

U.S. PATENT DOCUMENTS

| | | | | |
|---|---|---|---|---|
| 6,167,048 | A * | 12/2000 | Law et al. ................ | 370/395.62 |
| 6,628,613 | B1 * | 9/2003 | Joung et al. ................... | 370/230 |
| 7,525,911 | B2 * | 4/2009 | Hara et al. .................. | 370/230.1 |
| 7,545,858 | B2 * | 6/2009 | Jungerman ................... | 375/226 |
| 7,602,811 | B2 * | 10/2009 | Porter et al. .................. | 370/503 |

OTHER PUBLICATIONS

The Institute of Electrical and Electronics Engineers, Inc., IEEE Std 802.3-2005, Revision of IEEE std 802.3, IEEE Standard for Information Technology—Telecommunications and Information Exchange Between Systems—Local and Metropolitan Area Networks—Specific Requirements, Part 3: Carrier Sense Multiple Access with Collision Detection (CSMA/CD) Access Method and Physical Layer Specifications, Sections One to Five, Dec. 9, 2005.

(Continued)

*Primary Examiner* — Stefan Stoynov (57) ABSTRACT

Aspects of the disclosure provide a network device. The network device includes a first port coupled to a first device to communicate with the first device, and a clock wander compensation module. The first port recovers a first clock based on first signals received from the first device. The clock wander compensation module includes a global counter configured to count system clock cycles based on a system clock of the network device, and a first port counter configured to count first clock cycles based on the recovered first clock. Further, the first port transmits a first pause frame to the first device based on the global counter and the first port counter.

20 Claims, 6 Drawing Sheets

OTHER PUBLICATIONS

International Telecommunication Union (ITU), Telecommunication Standardization Sector of ITU, G.8262/Y.1362, Series G: Transmission Systems and Media, Digital System and Networks, Packet over Transport Aspects—Quality and Availability Targets, Series Y: Global Information Infrastructure, Internet Protocol Aspects and Next-Generation Networks, Internet Protocol Aspects-Transport, Timing Characteristics of Synchronous Ethernet Equipment Slave Clock (EEC), Aug. 2007.

The Institute of Electrical and Electronics Engineers, Inc., IEEE P1588 D2.2, Draft Standard for a Precision Clock Synchronization Protocol for Networked Measurement and Control Systems, 2007, Piscataway, NJ.

* cited by examiner

```
IF    <PORT CNT> - <GLOBAL CNT> ≥ THRESHOLD1    # COMPARE PORT COUNTER TO GLOBAL COUNTER
      WANDER = <PORT CNT> - <GLOBAL CNT>         # CALCULATE CLOCK WANDER
      TIMER = WANDER * <TIMER RATIO1>            # CALCULATE PAUSE TIMER
      GENERATE PAUSE FRAME WITH TIMER
      <PORT CNT> = <GLOBAL CNT>                  # RESET PORT COUNTER TO GLOBAL COUNTER

ELSE  DO NOTHING
```

```
IF      <PORT CNT> - <GLOBAL CNT> ≥ THRESHOLD1      # COMPARE PORT COUNTER TO GLOBAL COUNTER
        WANDER = <PORT CNT> - <GLOBAL CNT>           # CALCULATE CLOCK WANDER
        TIMER = WANDER * <TIMER RATIO1>              # CALCULATE PAUSE TIMER
        GENERATE PAUSE FRAME WITH TIMER
        <PORT CNT> = <GLOBAL CNT>                    # RESET PORT COUNTER TO GLOBAL COUNTER

ELSE IF <GLOBAL CNT> - <PORT CNT> ≥ THRESHOLD2       # COMPARE GLOBAL COUNTER TO PORT COUNTER
        WANDER = <GLOBAL CNT> - <PORT CNT>           # CALCULATE CLOCK WANDER
        TIMER = WANDER * <TIMER RATIO2>              # CALCULATE PAUSE TIMER
        PAUSE DATA TRANSMISSION BASED ON TIMER
        <PORT CNT> = <GLOBAL CNT>                    # RESET PORT COUNTER TO GLOBAL COUNTER

ELSE    DO NOTHING
```

FIG. 4B

FIG. 5

METHOD AND APPARATUS FOR CLOCK WANDER COMPENSATION

INCORPORATION BY REFERENCE

This application claims the benefit of U.S. Provisional Application No. 61/143,287, "Periodic Clock Wander Compensation" filed on Jan. 8, 2009, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Network devices may not have exactly the same transmission rate. For example, a network device generally transmits data based on a clock frequency generated by a local oscillator of the network device. Due to manufacturing and other variations, local oscillators of different network devices may have slightly different actual clock frequencies. The clock frequency difference is referred to as clock wander. The clock wander causes different network devices to transmit data at different transmission rates.

SUMMARY

Aspects of the disclosure can provide a network device. The network device includes a first port coupled to a first device to transmit and receive signals, and a clock wander compensation module. The first port recovers a first clock based on first signals received from the first device. The clock wander compensation module includes a global counter configured to count system clock cycles based on a system clock of the network device, and a first port counter configured to count first clock cycles based on the recovered first clock. In an embodiment, the first port transmits a first pause frame to the first device based on the global counter and the first port counter.

Further, the clock wander compensation module includes a controller. The controller calculates a first counter difference by subtracting a first count of the global counter from a second count of the first port counter. Then, the first port transmits the first pause frame when the first counter difference is larger than a first threshold. In addition, the first pause frame has a pause parameter that is determined based on the first counter difference. The clock wander compensation module is further configured to reset the first port counter in accordance with the global counter after transmitting the first pause frame.

In an embodiment, the first port pauses data transmission to the first device when the first count of the global counter is larger than the second count of the first port counter.

Additionally, in an embodiment, the network device includes a second port coupled to a second device to transmit and receive signals. The second port is configured to recover a second clock based on second signals received from the second device. Then, the clock wander compensation module further includes a second port counter configured to count second clock cycles based on the recovered second clock. In an embodiment, the second port transmits a second pause frame to the second device based on the global counter and the second port counter.

Aspects of the disclosure can provide a method for clock wander compensation. The method includes driving a global counter to count system clock cycles based on a system clock of a network device, recovering a first clock based on first signals received from a first device coupled to the network device, driving a first port counter to count first clock cycles based on the first clock, and transmitting a first pause frame to the first device based on the global counter and the first port counter.

In an embodiment, the method includes sampling the global counter to obtain a first count, sampling the first port counter to obtain a second count, subtracting the first count from the second count to obtain a first counter difference. Further, the method includes transmitting the first pause frame when the first counter difference is larger than a first threshold. In an example, the first pause frame has a first pause parameter that is determined based on the global counter and the first port counter.

According to an aspect of the disclosure, the method further includes recovering a second clock based on second signals received from a second device coupled to the network device, driving a second port counter to count second clock cycles based on the second clock, and transmitting a second pause frame to the second device based on the global counter and the second port counter.

Aspects of the disclosure can also provide an integrated circuit. The integrated circuit includes a first interface circuit, a first media access control (MAC) core coupled to the first interface circuit, and a first clock wander compensation circuit. The first interface circuit is coupled to a first device to communicate with the first device. The first interface circuit recovers a first clock based on first signals received from the first device. The first MAC core controls the first interface circuit for communication with the first device. The first clock wander compensation circuit includes a first global counter configured to count system clock cycles based on a system clock provided to the integrated circuit for operation, and a first port counter configured to count first clock cycles based on the recovered first clock. According to an aspect of the disclosure, the first MAC core controls the first interface circuit to transmit a first pause frame to the first device based on the first global counter and the first port counter.

In an embodiment, the first interface circuit includes a clock data recovery circuit configured to recover the first clock based on the first signals received from the first device. Further, the first clock wander compensation circuit includes a first clock wander compensation controller configured to calculate a first counter difference by subtracting a first count of the first global counter from a second count of the first port counter. Then, the first MAC core controls the first interface circuit to transmit the first pause frame when the first counter difference is larger than a first threshold. In an example, the first pause frame has a pause parameter that is determined based on the first counter difference.

According to an aspect of the disclosure, the first MAC core causes the first interface circuit to pause data transmission to the first device when the first count of the first global counter is larger than the second count of the first port counter.

Additionally, in an embodiment, the integrated circuit includes a second interface circuit coupled to a second device to communicate with the second device, a second media access control (MAC) core coupled to the second interface circuit, and a second clock wander compensation circuit. The second interface circuit is configured to recover a second clock based on second signals received from the second device. The second MAC core is configured to control the second interface circuit for communication with the second device. The second clock wander compensation circuit includes a second global counter configured to count the system clock cycles based on the system clock, and a second port counter configured to count second clock cycles based on the recovered second clock. The second MAC core controls the second interface circuit to transmit a second pause frame to the second device based on the second global counter and the second port counter. In an example, the first global counter and the second global counter are a same counter.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
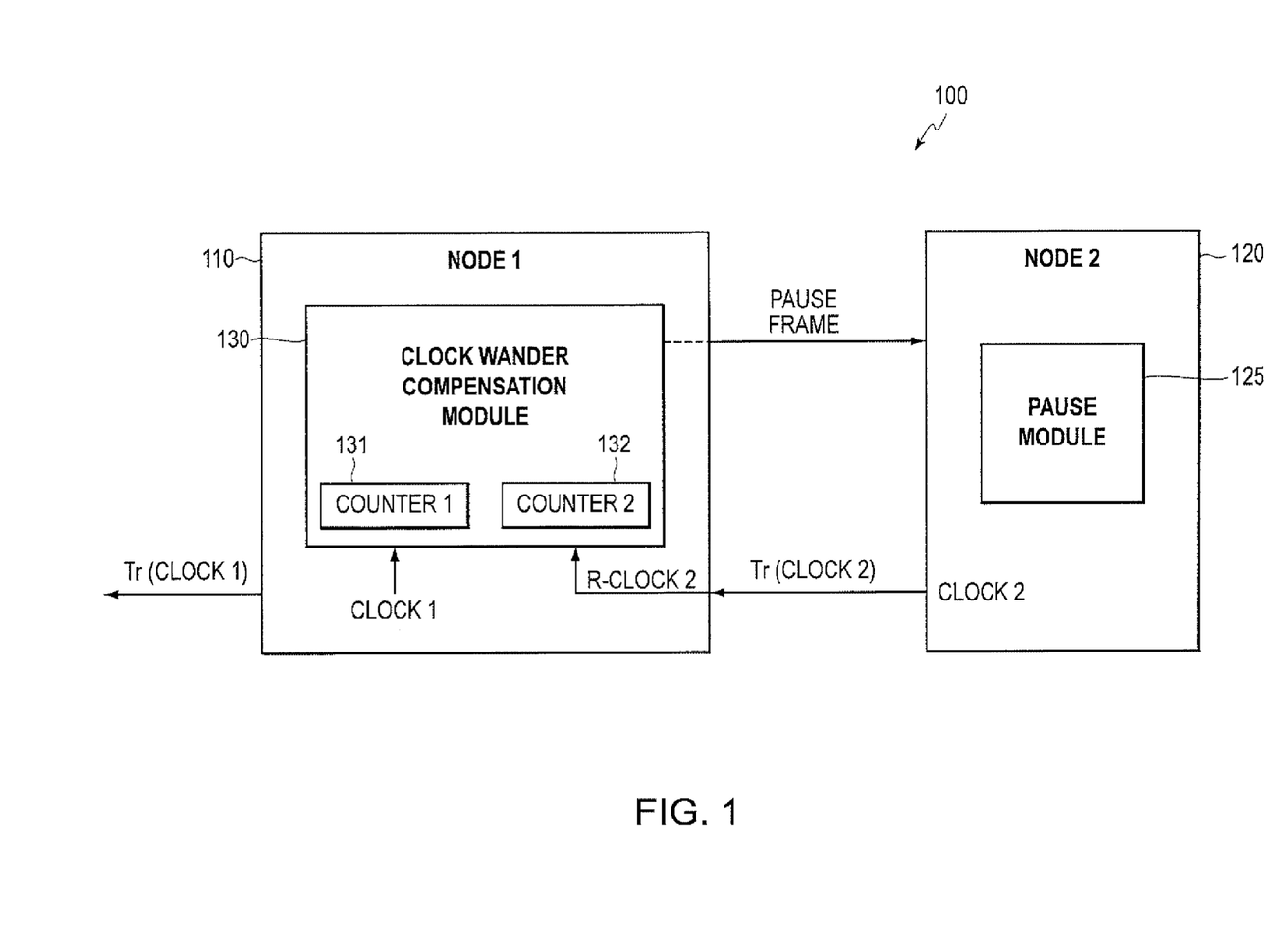
FIG. 1 shows a block diagram of a network example 100 having a clock wander compensation module according to an embodiment of the disclosure.

FIG. 1 shows a block diagram of a network example 100 having a clock wander compensation module 130 according to an embodiment of the disclosure. The network 100 includes a first node 110 and a second node 120 coupled together via any suitable link, such as a direct serial/parallel connection, fiber optical cable, and the like. Signals are transmitted between the first node 110 and the second node 120. The signals can correspond to data frames or can correspond to control frames, or any other suitable signal. It is noted that the network 100 can include other nodes (not shown) coupled with the first node 110 and/or the second node 120.

The first node 110 includes a network device, such as switch, router, network interface card (NIC), and the like, to receive signals and transmit signals in the network 100. In addition, the first node 110 can include other suitable devices, such as a memory device, microprocessor, and the like, to process received signals and generate signals for transmission.

The first node 110 operates based on a first system clock CLOCK1. For example, the first node 110 includes a crystal oscillator that is suitably used to generate the first system clock CLOCK1. The first system clock CLOCK1 can be suitably distributed in the first node 110 to provide operation clocks to various devices. For example, the network device in the first node 110 transmits signals based on the first system clock CLOCK1. Thus, the transmission rate of the network device in the first node 110 is a function of the first system clock CLOCK1.

Similarly, the second node 120 includes a network device, such as a switch, router, network interface card (NIC), and the like, to receive signals and transmit signals in the network 100. In addition, the second node 120 can include other suitable devices, such as a memory device, microprocessor, and the like, to process received signals and generate signals for transmission.

The second node 120 operates based on a second system clock CLOCK2. For example, the second node 120 also includes a crystal oscillator that is suitably used to generate the second system clock CLOCK2. The second system clock CLOCK2 can be suitably distributed in the second node 120 to provide operation clocks to various devices. For example, the network device in the second node 120 transmits signals based on the second system clock CLOCK2. Thus, the transmission rate of the network device in the second node 120 is a function of the second system clock CLOCK2.

The first system clock CLOCK1 and the second system clock CLOCK2 may not be exactly the same due to crystal oscillator manufacturing variations, for example. The clock difference between two devices communicating over the network is referred to as clock wander. In an Ethernet example, the clock wander can be in the range of ±100 parts-per-million (ppm). The clock wander can cause the transmission rate by the first node 110 and the transmission rate by the second node 120 to be slightly different. The slightly different transmission rates can result in packet accumulation or even packet loss over a relatively long period of time, and thereby affect network performance.

In an example, the first node 110 receives packets transmitted from the second node 120, and transmits the received packets to another node (not shown) in the network 100. Thus, the receiving rate of the first node 110 is a function of the second system clock CLOCK2, and the transmitting rate of the first node 110 is a function of the first system clock CLOCK1. When the first system clock CLOCK1 is slower than the second system clock CLOCK2, the transmitting rate of the first node 110 is slower than the receiving rate, and packets can be accumulated in a queue of the first node 110. When the queue is full, packets may be dropped. The packet drop causes packet loss in the network 100, and affects network performance.

According to an embodiment of the disclosure, a network node, such as the first node 110, includes a clock wander compensation module 130. The clock wander compensation module 130 detects a clock wander of the first node 110 and the second node 120 based on the first system clock CLOCK1 and a recovered clock based on signals received from the second node 120, and can cause a relatively faster node of the first node 110 and the second node 120 to pause transmission in order to compensate for the clock wander.

In an example, the clock wander compensation module 130 includes a first counter 131 and a second counter 132. The first counter 131 is driven by the first system clock CLOCK1, and the second counter 132 is driven by a recovered clock R-CLOCK2 from signals received from the second node 120. The clock wander compensation module 130 calculates a counter difference between the second counter 132 and the first counter 131. Based on the counter difference, the clock wander compensation module 130 detects a clock wander, and determines a faster node. Further, in accordance with an embodiment, the clock wander compensation module 130 controls the faster node to pause data transmission in order to compensate for the clock wander.

For example, when the first system clock CLOCK1 is slower than the second system clock CLOCK2, the first counter 131 counts slower than the second counter 132. In an example, the first counter 131 and the second counter 132 are initialized to be the same. After a time period, the first counter 131 is smaller than the second counter 132. The clock wander compensation module 130 samples the first counter 131 and the second counter 132 periodically to obtain a first count of the first counter 131 and a second count of the second counter 132, and calculates a first counter difference by subtracting the first count from the second count.

When the first counter difference is larger than a first threshold, the clock wander compensation module 130 detects a clock wander that the second counter 132 is faster than the first counter 131. Further, the clock wander compensation module 130 controls the first node 110 to generate and transmit a pause signal, such as a pause frame used in IEEE 802.3x, or IEEE 802.1Qbb, to the second node 120. In response to the pause signal, the second node 120 pauses data transmission to the first node 110.

In an embodiment, the second node 120 includes a pause module 125 that pauses data transmission, such as described in IEEE 802.3x or IEEE 802.1Qbb. When the second node 120 receives the pause signal, the pause module of the second node 120 can cause the second node 120 to pause data transmission to the first node 110 for a time duration. In an example, the time duration is determined by the first node 110, such as by the clock wander compensation module 130. The time duration can be indicated in the pause signal. In another example, the time duration is determined by the second node 120.

It is noted that, in an embodiment, the second node 120 pauses transmitting signals corresponding to data frames, but still suitably transmits signals corresponding to control frames.

On the other hand, when the first system clock CLOCK1 is faster than the second system clock CLOCK2, the first counter 131 counts faster than the second counter 132. After a time period, the first counter 131 is larger than the second counter 132. Similarly, the clock wander compensation module 130 samples the first counter 131 and the second counter 132 periodically to obtain the first count of the first counter 131 and the second count of the second counter 132, and calculates a second counter difference by subtracting the second count from the first count. In accordance with an embodiment, when the second counter difference is larger than a second threshold, the clock wander compensation module 130 detects a clock wander that the first node 110 is faster than the second node 120. Further, the clock wander compensation module 130 pauses data transmission from the first node 110 to the second node 120 for a time duration to compensate for the clock wander.

It is noted that the first node 110 pauses transmitting signals corresponding to data frames, but can still suitably transmit signals corresponding to control frames. It is also noted that the first threshold and the second threshold can be the same or can be different.

In an embodiment, the clock wander compensation module 130 pauses data transmission solely based on the first system clock CLOCK1 and the recovered clock R-CLOCK2. In an example, the second node 120 does not send data frames to the first node 110, but still sends control frames to the first node 110. The first node 110 receives signals corresponding to the control frames from the second node 120. Based on the received signals, the first node 110 generates the recovered clock R-CLOCK2. The recovered clock R-CLOCK2 is used to drive the second counter 132.

When the clock wander compensation module 130 determines that the first counter difference is larger than the first threshold, the first node 110 transmits a pause signal to the second node 120 to pause data transmission from the second node 120, even though the second node 120 does not transmit signals corresponding to data frames to the first node 110.

It is noted that the clock wander compensation module 130 can also determine to pause data transmission based on other parameters, such as queue status, data transmission status, and the like. For example, in another embodiment, the clock wander compensation module 130 pauses data transmission based on a combination of the first system clock CLOCK1, the recovered clock R-CLOCK2, and a queue status of the first node 110.

In an example, the first node 110 transmits based on a first clock of 1 GHz, and the second node 120 transmits based on a second clock of 1.0001 GHz. The clock difference is 100 parts-per-million (ppm), which is within a clock frequency tolerance of Ethernet (IEEE 802.3). The first counter 131 is driven by the first clock, and the second counter 132 is driven by a recovered clock, which can have substantially the same frequency as the second clock. The clock wander compensation module 130 samples the first counter 131 and the second counter 132 every 10 ms, and calculates the first counter difference. In the example, the first counter difference is 1000. Then, the clock wander compensation module 130 controls the first node 110 to send a pause signal with a timer to indicate 1000 cycles pause time. In response to the pause signal, the second node 120 can pause data transmission for 1 μs.

It is also noted that, in an embodiment, the second node 120 includes a clock wander compensation module (not shown). Thus, in the embodiment, the clock wander between the first node 110 and the second node 120 is compensated by various configurations. In a configuration example, each node pauses data transmission when its own clock wander compensation module detects that the node is a relatively faster node. In another configuration example, each node pauses data transmission when the node receives a pause frame from the other node. In another configuration example, one of the first node 110 and the second node 120 has a master clock wander compensation module. The master clock wander compensation module determines a relatively faster node, and pauses data transmission from the relatively faster node.

Figure 2:
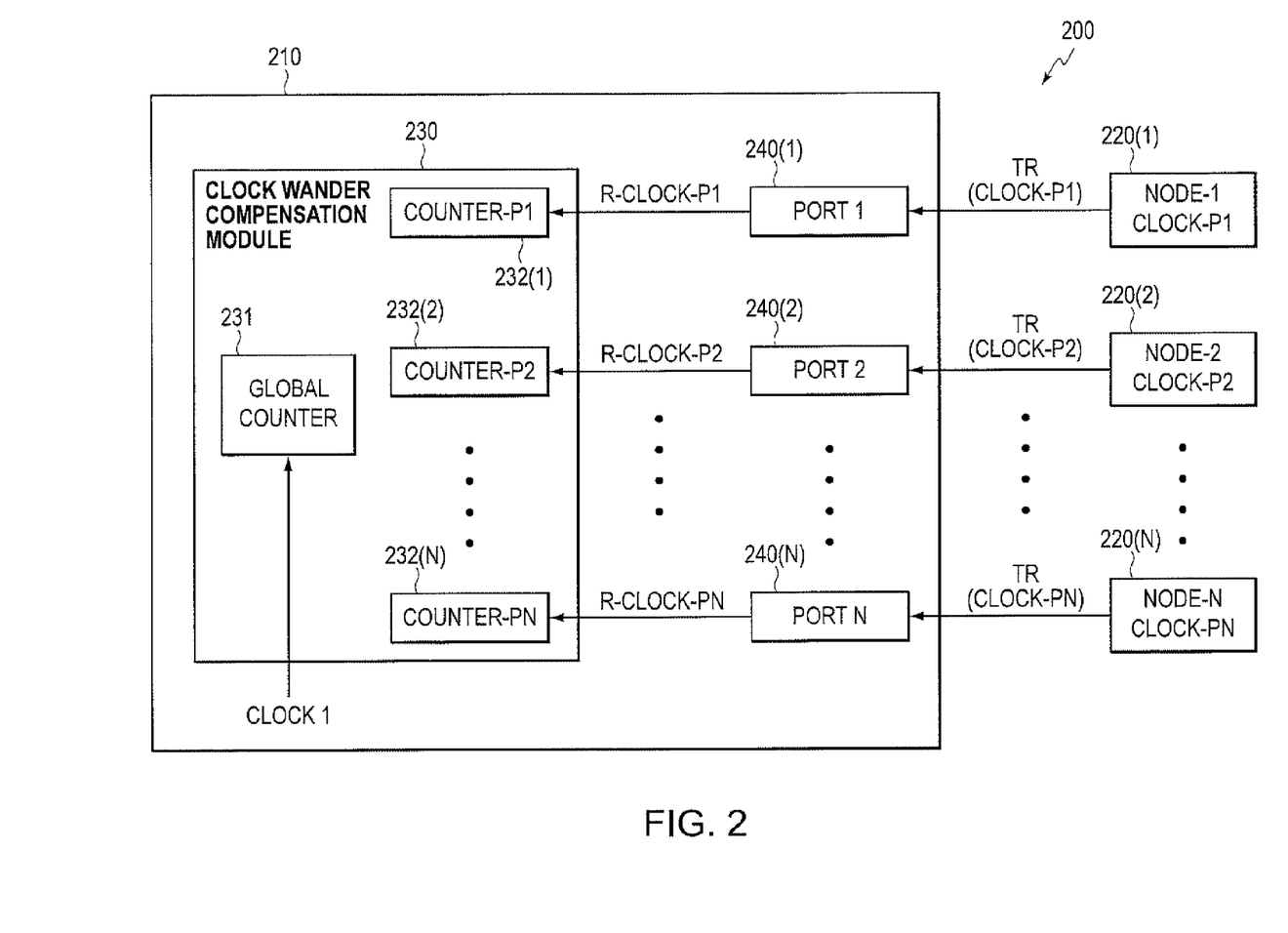
FIG. 2 shows another block diagram of a network example 200 having a clock wander compensation module according to an embodiment of the disclosure.

FIG. 2 shows another block diagram of a network example 200 having a clock wander compensation module 230 according to an embodiment of the disclosure. The network 200 includes a switch node 210 and a plurality of network nodes (NODE-1 to NODE-N) 220(1-N) coupled together as show in FIG. 2.

The switch node 210 includes a plurality of ports (PORT 1 to PORT N) 240(1-N). Each port 240 is used to couple a network node 220 with the switch node 210. The port 240 can receive signals transmitted from the network node 220 to the switch node 210, and can transmit signals to the network node 220. It is noted that the signals can correspond to data frames or can correspond to control frames, or any other suitable signal.

The switch node 210 operates based on a system clock CLOCK1. For example, the switch node 210 includes a crystal oscillator that is suitably used to generate the system clock CLOCK1. The system clock CLOCK1 can be suitably distributed in the switch node 210 to provide operation clocks. For example, the system clock CLOCK 1 is distributed to the plurality of ports 240(1-N). In an embodiment, the plurality of ports 240(1-N) in the switch node 210 transmits signals based on the system clock CLOCK1. Thus, the transmission rate of the plurality of ports 240(1-N) is a function of the system clock CLOCK1.

Each of the plurality of network nodes 220(1-N) can include any suitable device, such as a switch, router, network interface card (NIC), a memory device, microprocessor, and the like. The plurality of network nodes 220(1-N) operate based on respective system clocks. For example, the NODE-1 220(1) includes a crystal oscillator that is suitably used to generate a system clock CLOCK-P1, the NODE-2 220(2)

includes a crystal oscillator that is suitably used to generate a system clock CLOCK-P2, and the NODE-N 220(N) includes a crystal oscillator that is suitably used to generate a system clock CLOCK-PN. The NODE-1 220(1) transmits signals based on the system clock CLOCK-P1; thus the transmission rate of the NODE-1 220(1) is a function of the system clock CLOCK-P1. The NODE-2 220(2) transmits signals based on the system clock CLOCK-P2; thus the transmission rate of the NODE-2 220(2) is a function of the system clock CLOCK-P2. The NODE-N 220(N) transmits signals based on the system clock CLOCK-PN; thus the transmission rate of the NODE-N 220(N) is a function of the system clock CLOCK-PN.

The switch node 210 and the plurality of network nodes 220(1-N) may have different clock frequencies. More specifically, the system clock CLOCK1 of the switch node 210 and the plurality of system clocks CLOCK-P1 to CLOCK-PN may not be exactly the same due to crystal oscillator manufacturing variations, for example. Thus, the transmission rates of the switch node 210 and the plurality of network nodes 220(1-N) can be different. The different transmission rates can result in packet accumulation or even packet loss over a relatively long period of time, and affect network performance.

According to an embodiment of the disclosure, the switch node 210 includes a clock wander compensation module 230. The clock wander compensation module 230 is configured to detect and compensate the clock wander based on the system clock CLOCK1, and a plurality of recovered system clocks that are recovered based on signals received from the plurality of network nodes 220(1-N).

In the embodiment seen in FIG. 2, the clock wander compensation module 230 includes a global counter 231 and a plurality of port counters (COUNTER-P1 to COUNTER-PN) 232(1-N). The global counter 231 is driven by the system clock CLOCK1, and the plurality of port counters 232(1-N) are respectively driven by the recovered system clocks. For example, the PORT 1 240(1) receives signals transmitted from the NODE-1 220(1), and generates a recovered system clock R-CLOCK-P1 from the received signals. The recovered system clock R-CLOCK-P1 is used to drive the port counter COUNTER-P1 232(1). Similarly, the PORT 2 240(2) receives signals transmitted from the NODE-2 220(2), and generates a recovered system clock R-CLOCK-P2 from the received signals. The recovered system clock R-CLOCK-P2 is used to drive the port counter COUNTER-P2 232(2). The PORT N 240(N) receives signals from the NODE-N 220(N), and generates a recovered system clock R-CLOCK-PN from the received signals. The recovered system clock R-CLOCK-PN is used to drive the port counter COUNTER-PN 232(N).

The clock wander compensation module 230 is configured to detect and compensate for clock wanders based on the global counter 231 and the plurality of port counters 232(1-N). In an embodiment, the port counters 232(1-N) are initialized to be the same as the global counter 231. Then, the clock wander compensation module 230 samples the global counter 231 and the plurality of port counters 232(1-N) periodically. The clock wander compensation module 230 compares the sampled global counter and a sampled port counter corresponding to a network node to detect a clock wander. Further, based on the comparison, the clock wander compensation module 230 controls a port corresponding to the network node to compensate for the clock wander.

For example, the switch node 210 is slower than the NODE-1 220(1), and faster than the NODE-2 220(2). Thus, the global counter 231 counts slower than the first port counter COUNTER-P1 232(1), and counts faster than the second port counter COUNTER-P2 232(2). The clock wander compensation module 230 samples the global counter 231, the first port counter COUNTER-P1 232(1), and the second port counter COUNTER-P2 232(N) to obtain sampled counts periodically. Based on the sampled counts, the clock wander compensation module 230 calculates counter differences. For example, the clock wander compensation module 230 calculates a first counter difference by subtracting the sampled count of the global counter 231 from the sampled count of the first port counter COUNTER-P1 232(1). When the first counter difference is larger than a first threshold, in an embodiment, the clock wander compensation module 230 instructs the PORT 1 240(1) to generate and transmit a pause signal corresponding to, for example, a pause frame described in IEEE 802.3x or IEEE 802.1Qbb, to the NODE-1 220(1). In response to the pause signal, the NODE-1 220(1) pauses data transmission, such as signals corresponding to data frames, to the switch node 210 for a first time duration. In an example, the first time duration is determined by the clock wander compensation module 230 based on the first counter difference, and the first time duration can be indicated in the pause signal, for example, in the form of a pause parameter in the pause frame described in IEEE 802.3x. In an embodiment, the clock wander compensation module 230 resets the first port counter COUNTER-P1 232(1) in accordance with the global counter 231 after transmitting the pause signal.

The clock wander compensation module 230 also calculates a second counter difference by subtracting the sampled count of the second port counter COUNTER-P2 232(N) from the sampled count of the global counter 231. When the second counter difference is larger than a second threshold, in an embodiment, the clock wander compensation module 230 instructs the PORT 2 240(2) to pause transmitting signals corresponding to data frames to the NODE-2 220(2) for a second time duration. In an example, the second time duration is determined by the clock wander compensation module 230 based on the second counter difference. In an embodiment, the clock wander compensation module 230 then resets the second port counter COUNTER-P2 232(2) in accordance with the global counter 231.

It is noted that the first threshold and the second threshold can be the same or can be different.

In an embodiment, the clock wander compensation module 230 determines to pause data transmission solely based on the system clock CLOCK1 and the plurality of recovered system clocks R-CLOCK-P1 to R-CLOCK-PN. Thus, even though there is no data transmission between the switch node and a network node, or the data transmission between the switch node and the network node is relatively low, the clock wander compensation module 230 can instruct one of the switch node and the network node to pause data transmission. It is noted that the clock wander compensation module 230 can determine to pause data transmission based on other parameters, such as queue status, data transmission status, and the like.

Figure 3:
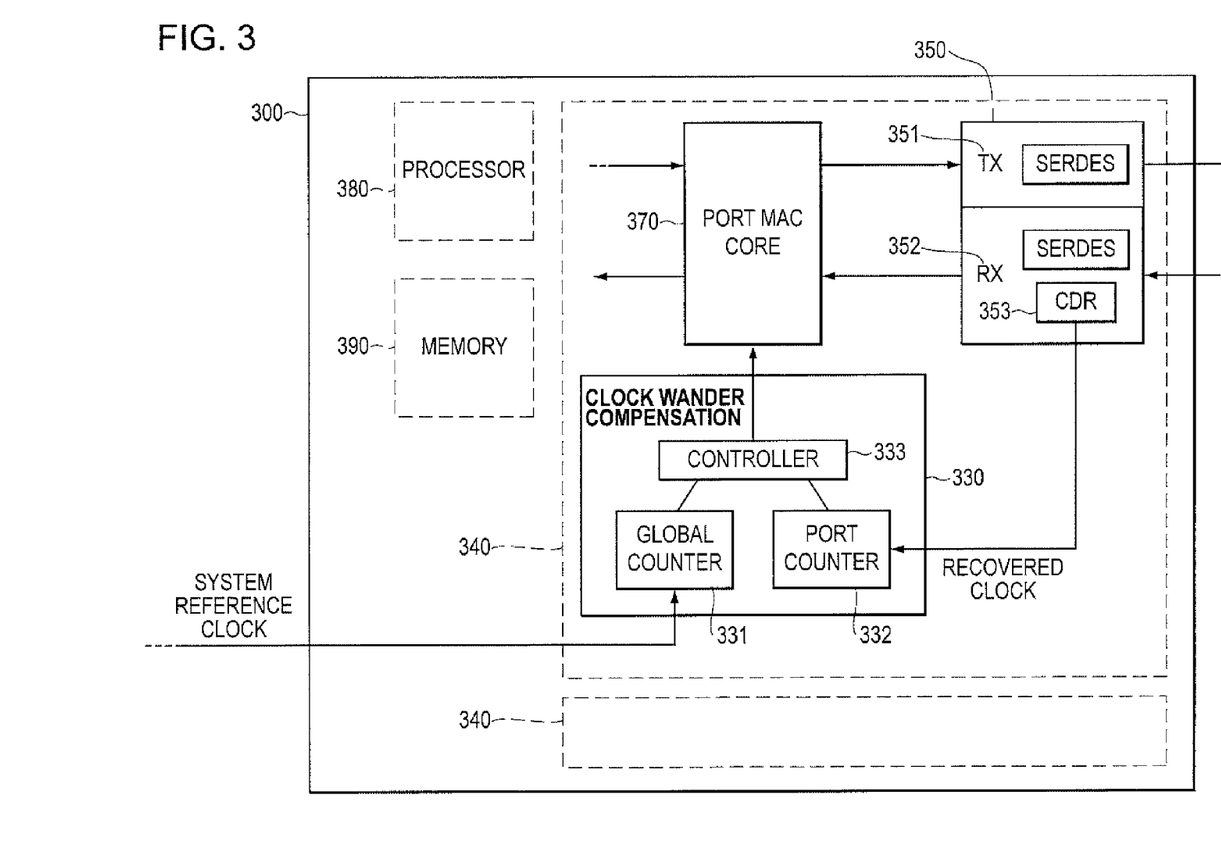
FIG. 3 shows a block diagram of an integrated circuit example 300 according to an embodiment of the disclosure.

FIG. 3 shows a block diagram of an integrated circuit (IC) example 300 according to an embodiment of the disclosure. The integrated circuit 300 is suitable to be included in a network node, such as the first node 110 in FIG. 1, or the switch node 210 in FIG. 2, within a network. In the embodiment seen in FIG. 3, the integrated circuit 300 includes a plurality of port modules 340 that can be suitably coupled to a plurality of network nodes, such as peer network nodes, in the network to receive signals from the plurality of network nodes and transmit signals to the plurality of network nodes.

In addition, the integrated circuit 300 can include other suitable circuit modules, such as a memory module 390, processor module 380, and the like.

According to an embodiment of the disclosure, a port module 340 is coupled to a network node via a suitable link. The port module 340 includes an interface module 350 coupled to the suitable link, a port media access control (MAC) core module 370, and a clock wander compensation module 330. In an embodiment, these elements are coupled together as shown in FIG. 3.

The interface module 350 includes a transmitting portion 351 and a receiving portion 352. The transmitting portion 351 includes circuits for transmitting signals corresponding to data frames, control frames, and the like. The transmitting portion 351 receives a frame, such as a data frame or a control frame from the port MAC core module 370. Then, the transmitting portion 351 packages the frame into a packet. Further, the transmitting portion 351 drives electrical signals corresponding to the packet onto the coupled suitable link.

In an embodiment, the transmitting portion 351 includes a format converter, such as a serializer/deserializer (SERDES), that is configured to convert the frame from a parallel format to a serial format used for transmission. Further, the transmitting portion 351 includes an encoder and a scrambler that can be suitably used to pack the frame into the packet. In addition, the transmitting portion 351 includes a driver that can power-drive electrical signals in accordance with the packet.

The receiving portion 352 includes circuits for receiving signals corresponding to data frames, control frames, and the like. The receiving portion 352 receives electrical signals, and obtains a digital packet from the received electrical signals. Further, the receiving portion 352 unpacks the digital packet, and obtains a frame from the digital packet.

In an embodiment, the receiving portion 352 includes a clock data recovery (CDR) module 353. The CDR module 353 recovers a clock signal from the received electrical signals. Further, the recovered clock is used to sample the received electrical signals to obtain discrete signals. Then, in an embodiment, the CDR module 353 includes an analog to digital converter (ADC) module to convert the discrete signals into a digital packet. The receiving portion 352 can include other suitable modules to obtain the frame from the digital packet. For example, in an embodiment, the receiving portion 352 includes a decoder and a descrambler to unpack the digital packet. Further, the receiving portion 352 includes a SERDES module to convert the unpacked packet from a serial format into a parallel format.

The port MAC core module 370 provides frames to the interface module 350 for transmission, and receives frames from the interface module 350 to determine further operations on the received frames. In an embodiment, the port MAC core module 370 generates a pause frame, and provides the pause frame to the interface module 350 for transmission. Further, in an embodiment, the port MAC core module 370 pauses providing data frames to the interface module 350 for transmission, for example, in response to a control signal from the clock wander compensation module 330.

It is noted that the port MAC core module 370 can be implemented according to any suitable algorithm, standard, or protocol for media access control, and can be implemented by various techniques. In an example, the port MAC core module 370 is implemented as a processor executing software instructions. In another example, the port MAC core module 370 is implemented as suitable application specific integrated circuits (ASIC).

In the embodiment seen in FIG. 3, the clock wander compensation module 330 includes a global counter 331, a port counter 332 and a controller module 333. The global counter 331 is driven by a system reference clock. In an embodiment, the integrated circuit 300 is mounted on a circuit board in the network device that includes a crystal oscillator module. The crystal oscillator module suitably generates the system reference clock. The system reference clock can be provided to the integrated circuits on the circuit board for operation. The port counter 332 is driven by the recovered clock from the CDR 353.

The controller module 333 generates a control signal to the port MAC core module 370 based on the global counter 331 and the port counter 332. In an embodiment, the controller module 333 initializes the port counter 332 to be the same as the global counter 331. Then, the controller module 333 samples the global counter 331 and the port counter 332 to obtain a first count of the global counter 331 and a second count of the port counter 332 periodically. Further, the controller module 333 compares the first count and the second count to detect a clock wander, and generates the control signal based on the comparison.

For example, the controller module 333 calculates a first counter difference by subtracting the first count from the second count. When the first counter difference is larger than a first threshold, the controller module 333 generates the control signal to instruct the port MAC core module 370 to generate and provide a pause frame, such as a pause frame described in IEEE 802.3x, to the interface module 350. The interface module 350 then converts the pause frame into the serial format, packs the converted pause frame into a packet, and transmits electrical signals corresponding to the packet to the coupled network node via the suitable link. In response to the electrical signals, the coupled network node pauses data transmission to the network node for a first time duration. In an example, the first time duration is determined by the controller module 333 based on the first counter difference, and the first time duration can be indicated in the control signal. Further, the port MAC core module 370 includes the first time duration in the pause frame, for example, in the form of a pause parameter described in IEEE 802.3x. In an embodiment, the controller module 333 resets the port counter 332 in accordance with the global counter 331 after transmitting the control signal.

In another example, the controller module 333 calculates a second counter difference by subtracting the second count from the first count. When the second counter difference is larger than a second threshold, the controller module 333 generates a control signal to the port MAC core 370 to pause providing data frames to the interface module 350 for a second time duration. In an example, the second time duration is determined by the controller module 333 based on the second counter difference. In an embodiment, the controller module 333 then resets the port counter 332 in accordance with the global counter 331. It is noted that, in an embodiment, the port MAC core 370 is configured to still provide control frames to the interface module 350 while pausing providing data frames.

Figure 4A:
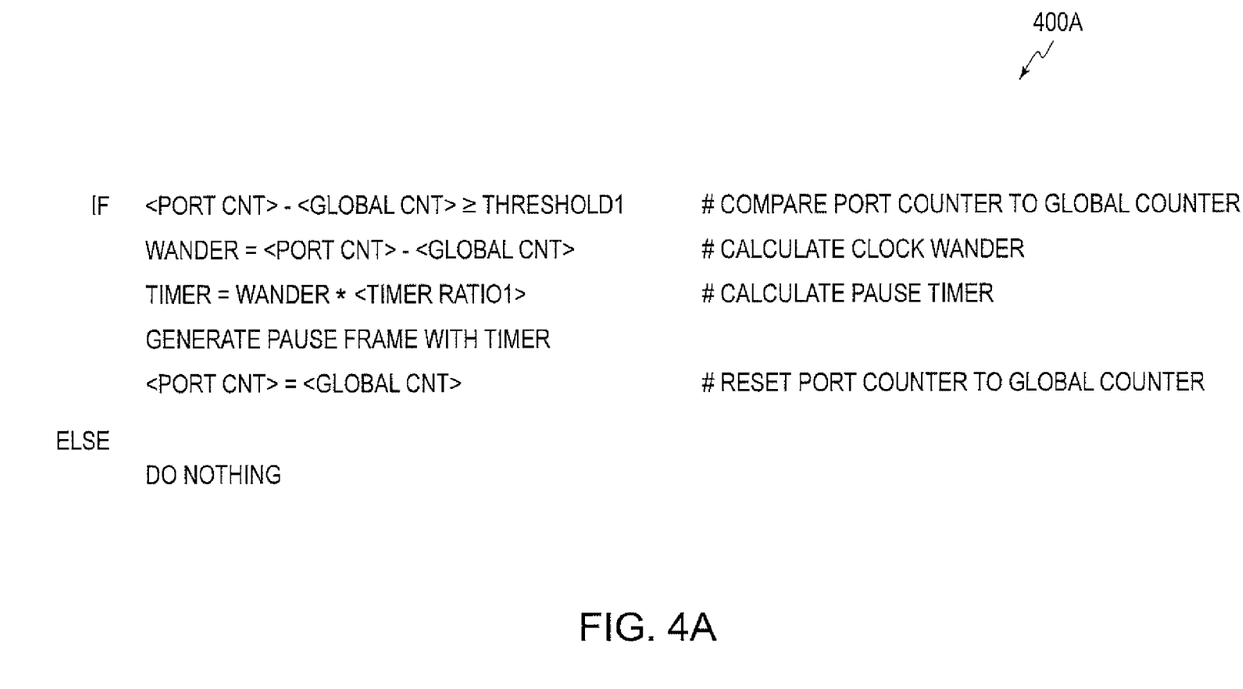
FIGS. 4A-4B show pseudo codes of algorithm examples 400A and 400B for clock wander compensation.

FIG. 4A shows an algorithm example 400A according to an embodiment of the disclosure. The algorithm 400 A can be implemented in the controller module 333, and can be executed periodically according to a sampling period.

Figure 4B:
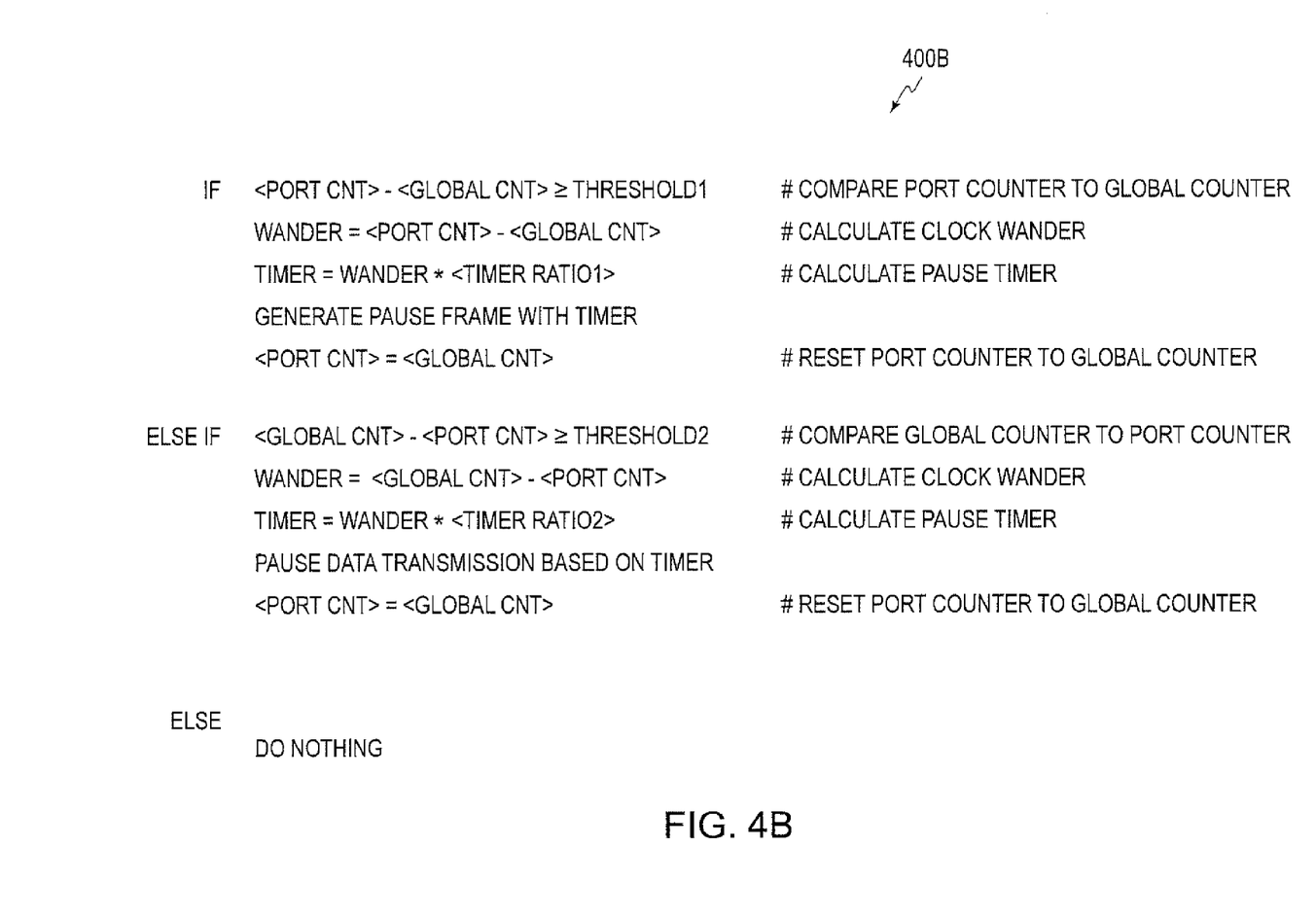

FIG. 4B shows another algorithm example 400B according to an embodiment of the disclosure. Similarly, the algorithm 400B can be implemented in the controller module 333, and can be executed periodically according to the sampling period.

It is noted that various parameters in the algorithms 400A and 400 B are configurable. For example, the sampling period is configurable. The thresholds, such as THRESHOLD1 and THRESHOLD2, are configurable. It is also noted that the counters count in clock cycles, thus the TIME RATIO1 and TIME RATIO2 can be suitably determined based on port speed and clock frequency.

Figure 5:
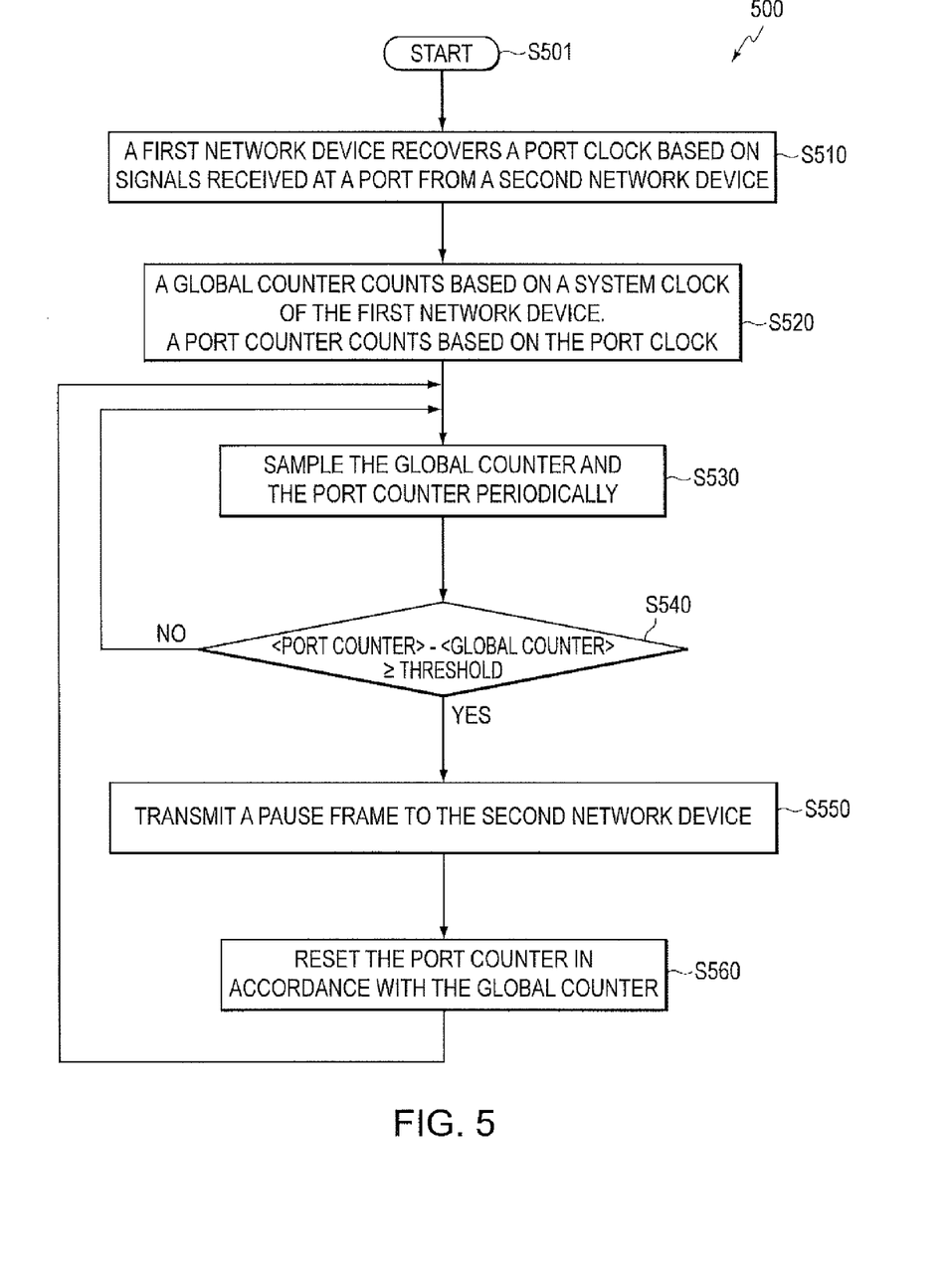
FIG. 5 shows a flow chart outlining a process example 500 for clock wander compensation according to an embodiment of the disclosure.

FIG. 5 shows a flow chart outlining a process example 500 for a clock wander compensation module to compensate a clock wander according to an embodiment of the disclosure. The clock wander compensation module is included in a first network device. The first network device includes a port coupled with a second network device. The port transmits signals to the second network device, and receives signals from the second network device. The process starts at S501, and proceeds to S510.

At S510, the clock wander compensation module receives a port clock recovered based on signals received at the port from the second network device. In an example, the port includes a CDR module. The CDR module recovers the port clock based on the signals received from the second network device. The recovered port clock can correspond to the system clock of the second network device.

At S520, the clock wander compensation module uses the recovered port clock to drive a port counter, and uses a system clock of the first network device to drive a global counter.

At S530, the clock wander compensation module samples the global counter and the port counter periodically.

At S540, the clock wander compensation module calculates a counter difference based on the sampled global counter and the sampled port counter. Based on the counter difference, the clock wander compensation module determines whether the second network device is faster than the first network device. Further, the clock wander compensation module determines whether the counter difference is larger than a threshold. When the counter difference is larger than the threshold, the process proceeds to S550; otherwise, the process returns to S530.

At S550, the clock wander compensation module controls the first network device to transmit a pause frame to the second network device. The pause frame includes a pause parameter indicative of a time duration. In response to the pause frame, the second network device pauses data transmission to the first network device for the time duration. In an embodiment, the time duration is determined by the clock wander compensation module to fully compensate for the counter difference.

At S560, the clock wander compensation module resets the port counter in accordance with the global counter and the time duration. When the time duration is calculated to fully compensate for the counter difference, the port counter can be reset to be the same as the global counter. It is noted that when the time duration for pausing data transmission from the second network device to the first network device can not fully compensate for the counter difference, the port counter can be suitably reset based on the time duration. The process then returns to S530.

The process 500 can be suitably adjusted. In an example, the clock wander compensation module may determine whether the first network device is faster than the second network device. When the first network device is faster then the second network device, the clock wander compensation module may instruct the port of the first network device to pause data transmission to the second network device for a time duration to compensate for the clock wander.

It is noted that steps in the process 500 can be executed in parallel, or in a different sequence. For example, the global counter and the port counter count continuously in S520, while the controller in the clock wander compensation module performs S530-S560.

While the invention has been described in conjunction with the specific embodiments thereof that are proposed as examples, it is evident that many alternatives, modifications, and variations will be apparent to those skilled in the art. Accordingly, embodiments of the invention as set forth herein are intended to be illustrative, not limiting. There are changes that may be made without departing from the scope of the invention.

What is claimed is:

1. A network device, comprising:
a first port coupled to a first device to transmit and receive signals, the first port configured to recover a first clock based on first signals received from the first device; and
a clock wander compensation module that includes:
a global counter configured to count system clock cycles based on a system clock of the network device; and
a first port counter configured to count first clock cycles based on the recovered first clock, the first port transmitting a first pause frame to the first device based on the global counter and the first port counter.

2. The network device of claim 1, wherein the clock wander compensation module is configured to calculate a first counter difference by subtracting a first count of the global counter from a second count of the first port counter, the first port transmitting the first pause frame when the first counter difference is larger than a first threshold.

3. The network device of claim 2, wherein the first port transmits the first pause frame having a pause parameter that is determined based on the first counter difference.

4. The network device of claim 1, wherein the clock wander compensation module is further configured to reset the first port counter in accordance with the global counter.

5. The network device of claim 1, wherein the first port pauses data transmission to the first device when a first count of the global counter is larger than a second count of the first port counter.

6. The network device of claim 1, wherein:
a second port is coupled to a second device to transmit and receive signals, the second port configured to recover a second clock based on second signals received from the second device; and
the clock wander compensation module further includes a second port counter configured to count second clock cycles based on the recovered second clock, the second port transmitting a second pause frame to the second device based on the global counter and the second port counter.

7. A method for clock wander compensation, comprising:
driving a global counter to count system clock cycles based on a system clock of a network device;
recovering a first clock based on first signals received from a first device coupled to the network device;
driving a first port counter to count first clock cycles based on the first clock; and
transmitting a first pause frame to the first device based on the global counter and the first port counter.

8. The method of claim 7, further comprising:
sampling the global counter to obtain a first count;
sampling the first port counter to obtain a second count; and
subtracting the first count from the second count to obtain a first counter difference.

9. The method of claim 8, wherein transmitting the first pause frame to the first device based on the global counter and the first port counter further comprises:

transmitting the first pause frame when the first counter difference is larger than a first threshold.

10. The method of claim 8, wherein transmitting the first pause frame to the first device based on the first counter difference further comprises:
transmitting the first pause frame having a first pause parameter that is determined based on the global counter and the first port counter.

11. The method of claim 10, further comprising:
resetting the first port counter in accordance with the global counter.

12. The method of claim 7, further comprising:
recovering a second clock based on second signals received from a second device coupled to the network device;
driving a second port counter to count second clock cycles based on the second clock; and
transmitting a second pause frame to the second device based on the global counter and the second port counter.

13. An integrated circuit, comprising:
a first interface circuit coupled to a first device to receive and transmit signals, the first interface circuit configured to recover a first clock based on first signals received from the first device;
a first media access control (MAC) core coupled to the first interface circuit, the first MAC core configured to control the first interface circuit for communication with the first device; and
a first clock wander compensation circuit that includes:
a first global counter configured to count system clock cycles based on a system clock provided to the integrated circuit for operation; and
a first port counter configured to count first clock cycles based on the recovered first clock, the first MAC core causing the first interface circuit to transmit a first pause frame to the first device based on the first global counter and the first port counter.

14. The integrated circuit of claim 13, wherein the first interface circuit further comprises:
a clock data recovery circuit configured to recover the first clock based on the first signals received from the first device.

15. The integrated circuit of claim 13, wherein the first clock wander compensation circuit further comprises:
a first clock wander compensation controller configured to calculate a first counter difference by subtracting a first count of the first global counter from a second count of the first port counter, the first MAC core causing the first interface circuit to transmit the first pause frame when the first counter difference is larger than a first threshold.

16. The integrated circuit of claim 15, wherein the first interface circuit transmits the first pause frame having a pause parameter that is determined based on the first counter difference.

17. The integrated circuit of claim 16, wherein the first clock wander compensation circuit is further configured to reset the first port counter in accordance with the first global counter.

18. The integrated circuit of claim 13, wherein the first MAC core causes the first interface circuit to pause data transmission to the first device when a first count of the first global counter is larger than a second count of the first port counter.

19. The integrated circuit of claim 13, further comprising:
a second interface circuit coupled to a second device to receive and transmit signals, the second interface circuit configured to recover a second clock based on second signals received from the second device;
a second media access control (MAC) core coupled to the second interface circuit, the second MAC core configured to control the second interface circuit for communication with the second device;
a second clock wander compensation circuit that includes:
a second global counter configured to count the system clock cycles based on the system clock; and
a second port counter configured to count second clock cycles based on the recovered second clock, the second MAC core causing the second interface circuit to transmit a second pause frame to the second device based on the second global counter and the second port counter.

20. The integrated circuit of claim 19, wherein the first global counter and the second global counter are a same counter.

* * * * *